US012800332B2

(12) United States Patent
Seder et al.

(10) Patent No.: US 12,800,332 B2
(45) Date of Patent: Nov. 17, 2026

(54) HYBRID AUGMENTED NAVIGATION SYSTEM

(71) Applicant: GM Global Technology Operations LLC, Detroit, MI (US)

(72) Inventors: Thomas A. Seder, Fraser, MI (US); Joseph F. Szczerba, Grand Blanc, MI (US); Kai-Han Chang, Madison Heights, MI (US); Guy N. Kennerly, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 32 days.

(21) Appl. No.: 18/671,246

(22) Filed: May 22, 2024

(65) Prior Publication Data

US 2025/0362145 A1 Nov. 27, 2025

(51) Int. Cl.
*G01C 21/36* (2006.01)
*G06F 3/01* (2006.01)

(52) U.S. Cl.
CPC ........... *G01C 21/365* (2013.01); *G06F 3/013* (2013.01)

(58) Field of Classification Search
CPC .............................. G01C 21/365; G06F 3/013
See application file for complete search history.

(56) References Cited

U.S. PATENT DOCUMENTS

2006/0244638 A1* 11/2006 Lettau .................. G08G 1/0969 340/995.1
2017/0253181 A1* 9/2017 Choi .................... B60K 35/232
2025/0196642 A1* 6/2025 Rhee ...................... B60K 35/26

FOREIGN PATENT DOCUMENTS

| | | | |
|---|---|---|---|
| DE | 102004060380 | A1 | 7/2005 |
| DE | 102010003851 | A1 | 10/2011 |
| DE | 102012216144 | A1 | 5/2014 |
| DE | 102014219567 | A1 | 4/2015 |
| DE | 102018203927 | A1 | 9/2019 |
| WO | WO-2023145852 | A1 | 8/2023 |

* cited by examiner

*Primary Examiner* — Scott A Browne
*Assistant Examiner* — Izcalli Rios-Aguirre
(74) *Attorney, Agent, or Firm* — Honigman LLP; Matthew H. Szalach

(57) ABSTRACT

A hybrid augmented navigation system for a vehicle includes a windshield including a primary viewing envelope, the primary viewing envelope including a tactical region and a strategic region, an imaging system including a tracking camera, and a navigation system including navigation data. The hybrid augmented navigation system also includes a controller that is communicatively coupled with the imaging system and the navigation system. The controller is configured to generate a hybrid augmented navigation at the windshield via a hybrid augmented navigation application. The hybrid augmented navigation application includes tactical navigation graphics projected at the tactical region of the primary viewing envelope and strategic navigation graphics projected at the strategic region of the primary viewing envelope. The tactical navigation graphics include a navigation path, and the strategic navigation graphics include landmark indicia based on the navigation data.

20 Claims, 5 Drawing Sheets

HYBRID AUGMENTED NAVIGATION SYSTEM

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an augmented navigation system for a vehicle.

Vehicles are typically equipped with a navigation system that provides a user with navigation directions on an infotainment device of the vehicle. However, to monitor the navigation directions, the user may look away from the road based on the location of the infotainment device. Some vehicles may be equipped with head-up displays that are configured to project a virtual guide in an effort to maintain the driver's eyes on the road while driving. However, in these systems, the virtual guide may only provide tactical navigation information (i.e., an arrow or path), while the user utilizes the navigation system on a head-down display outside of a primary viewing envelope of the driver. Traditional maps may also be cluttered with information and data, which may be confusing for drivers when trying to navigate the vehicle.

SUMMARY

In some aspects, a hybrid augmented navigation system for a vehicle includes a windshield including a primary viewing envelope, the primary viewing envelope including a tactical region and a strategic region, an imaging system including a tracking camera, and a navigation system including navigation data. The hybrid augmented navigation system also includes a controller that is communicatively coupled with the imaging system and the navigation system. The controller is configured to generate a hybrid augmented navigation at the windshield via a hybrid augmented navigation application. The hybrid augmented navigation application includes tactical navigation graphics projected at the tactical region of the primary viewing envelope and strategic navigation graphics projected at the strategic region of the primary viewing envelope. The tactical navigation graphics include a navigation path, and the strategic navigation graphics include landmark indicia based on the navigation data.

In some examples, the hybrid augmented navigation application may be configured to generate the tactical navigation graphics and the strategic navigation graphics based on image data from the imaging system. Optionally, the navigation path may be projected at the tactical region of the windshield. In some instances, the strategic navigation graphics may include distance instructions, the distance instructions being a distance between a first landmark and a second landmark. In some configurations, the hybrid augmented navigation application may include a compass function configured to project a destination marker relative to a location of the vehicle via the strategic navigation graphics. The compass function may be configured to move the destination marker about the landmark directions based on a direction of the vehicle.

In further examples, a display may be proximate to the windshield and may include a first head-up display (HUD) and a second HUD. The first HUD may be configured to project the tactical navigation graphics at the tactical region of the primary viewing envelope, and the second HUD may be configured to project the strategic navigation graphics at the strategic region of the primary viewing envelope. Optionally, the tracking camera may be configured to monitor a gaze of a user. The hybrid augmented navigation application may be configured to identify the primary viewing envelope based on the monitored gaze received from the tracking camera.

In other aspects, a computer-implemented method when executed by data processing hardware causes the data processing hardware to perform operations. The operations include generating, via a navigation system, a route of a vehicle to a destination, executing, based on the generated route, a hybrid augmented navigation application, and determining, based on navigation data from the navigation system and image data from an imaging system, landmarks along the route. The operations also include generating, via the hybrid augmented navigation application, tactical navigation graphics and strategic navigation graphics based on the generated route and determined landmarks along the route, projecting, at a primary viewing envelope of a windshield, the tactical navigation graphics and the strategic navigation graphics, and updating, via the hybrid augmented navigation application, the tactical navigation graphics and the strategic navigation graphics based on updated image data.

In some examples, the operations may include executing, via the hybrid augmented navigation application, a compass function based on the strategic navigation graphics and the destination. Optionally, executing the compass function may include orienting, based on the destination, the strategic navigation graphics. In some instances, projecting the tactical navigation graphics and the strategic navigation graphics may include projecting the tactical navigation graphics at a tactical region of the primary viewing envelope and projecting the strategic navigation graphics at a strategic region of the primary viewing envelope. In further examples, generating the strategic navigation graphics may include generating landmark indicia.

In further aspects, a hybrid augmented navigation system includes data processing hardware and memory hardware in communication with the data processing hardware. The memory hardware stores instructions that when executed on the data processing hardware cause the data processing hardware to perform operations. The operations include generating, via a navigation system, a route of a vehicle to a destination, executing, based on the generated route, a hybrid augmented navigation application, and determining, based on navigation data from the navigation system and image data from an imaging system, landmarks along the route. The operations also include generating, via the hybrid augmented navigation application, tactical navigation graphics and strategic navigation graphics based on the generated route and determined landmarks along the route, projecting, at a primary viewing envelope of a windshield, the tactical navigation graphics and the strategic navigation graphics, and updating, via the augmented navigation application, the tactical navigation graphics and the strategic navigation graphics based on updated image data.

The operations may include executing, via the hybrid augmented navigation application, a compass function based on the strategic navigation graphics and the destination. In some examples, executing the compass function may include orienting, based on the destination, the strategic navigation graphics. Optionally, projecting the tactical navigation graphics and the strategic navigation graphics may include projecting the tactical navigation graphics at a tactical region of the primary viewing envelope and projecting the strategic navigation graphics at a strategic region of the primary viewing envelope. In some instances, generating the strategic navigation graphics includes generating landmark indicia.

A vehicle may be equipped with the hybrid augmented navigation system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
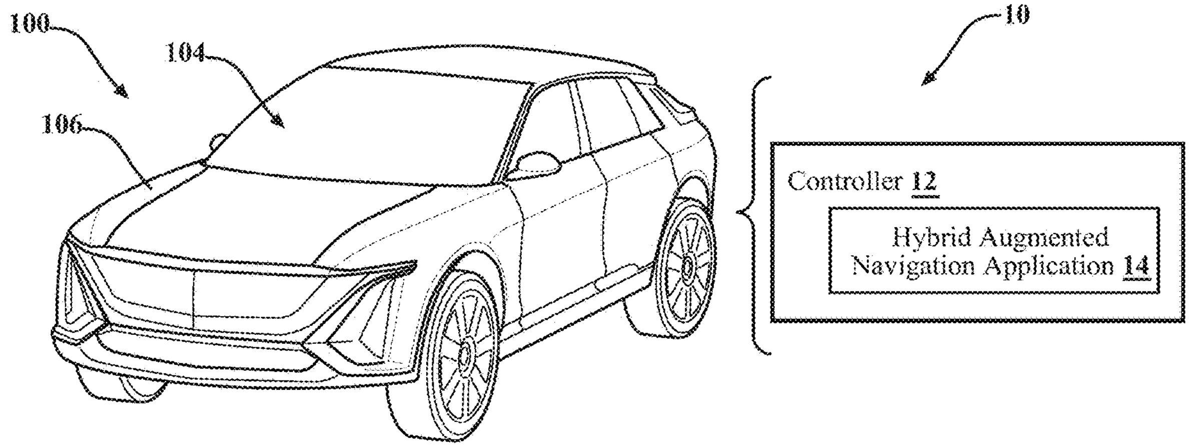
FIG. 1 is a schematic diagram of a vehicle equipped with a hybrid augmented navigation system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
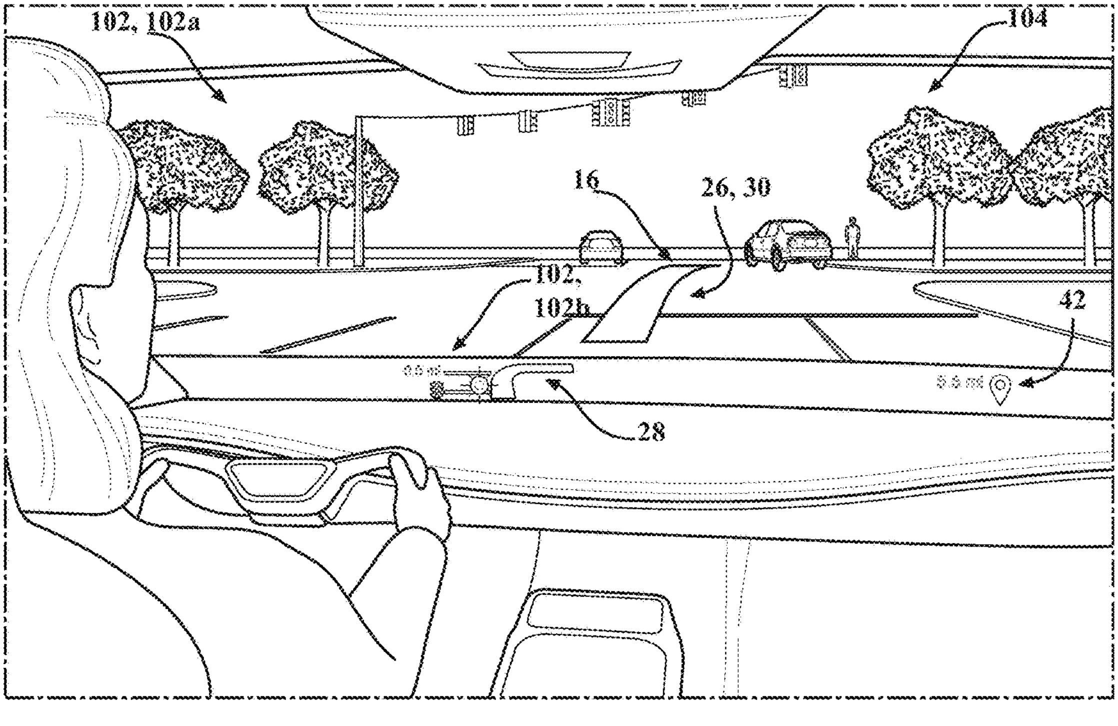
FIG. 2 is a partial perspective view of a driver of a vehicle using a hybrid augmented navigation of a hybrid augmented navigation system according to the present disclosure.
Figure 3:
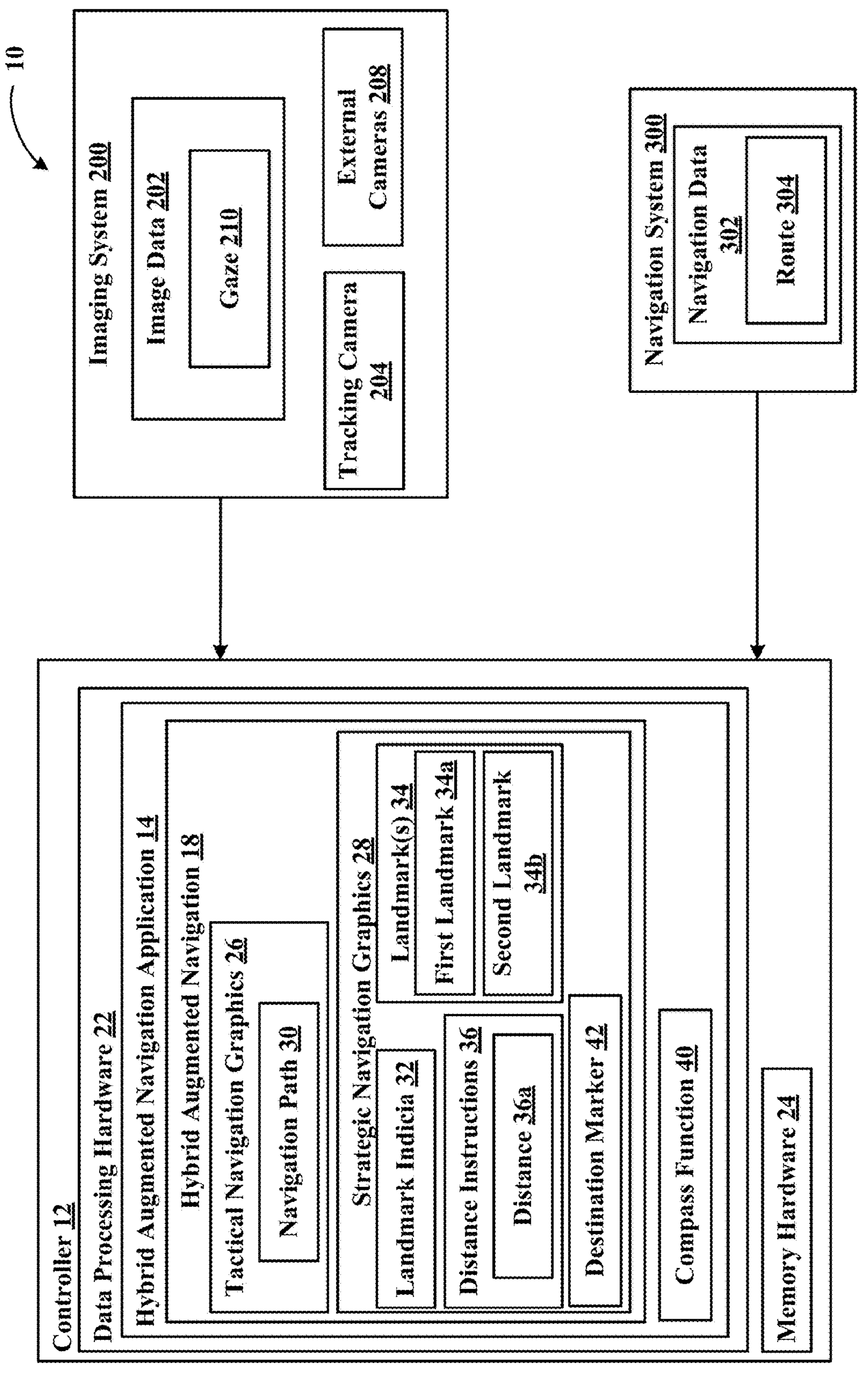
FIG. 3 is an exemplary block diagram of a hybrid augmented navigation system according to the present disclosure.

Referring to FIGS. 1-3, a hybrid augmented navigation system 10 is configured as part of a vehicle 100 and includes a controller 12 configured with a hybrid augmented navigation application 14. The hybrid augmented navigation system 10 advantageously assists a driver in monitoring a trajectory 16 of the vehicle 100 while executing a hybrid augmented navigation 18 generated by the hybrid augmented navigation application 14. For example, the hybrid augmented navigation system 10 provides the driver with an information architecture that enables simultaneous tactical driving assistance and strategic planning via the hybrid augmented navigation application 14. As described herein, the hybrid augmented navigation 18 is configured to assist the driver by being projected within a primary viewing window 102 of a windshield 104 of the vehicle 100. For example, the primary viewing envelope 102 may be an area in front of the driver. Thus, the driver may maintain a forward and upward line of sight while operating the vehicle 100 and still have viewing access to the hybrid augmented navigation 18.

The primary viewing envelope 102 includes a tactical region 102*a* and a strategic region 102*b* at which the hybrid augmented navigation 18 is projected. In some examples, the tactical region 102*a* may be an upper majority of the windshield 104 as compared with the strategic region 102*b*. The strategic region 102*b* may correspond with a blacked out area of the windshield 104. In some examples, the strategic region 102*b* may be disposed at an upper region of the windshield 104, so long as the strategic region 102*b* is within the primary viewing envelope 102 of the windshield 104.

The vehicle 100 is also equipped with an imaging system 200 that communicates image data 202 with the hybrid augmented navigation application 14, described below. The imaging system 200 includes a tracking camera 204 (FIG. 5) and is configured to project the hybrid augmented navigation 18 at the primary viewing envelope 102, described below. The imaging system 200 may also include external cameras 208 integrated with a body 106 of the vehicle 100 at various locations for advantageous capture of a surrounding environment. The external cameras 208 may be utilized by the imaging system 200 to capture landmarks used as part of the hybrid augmented navigation 18, described below.

Figure 5:
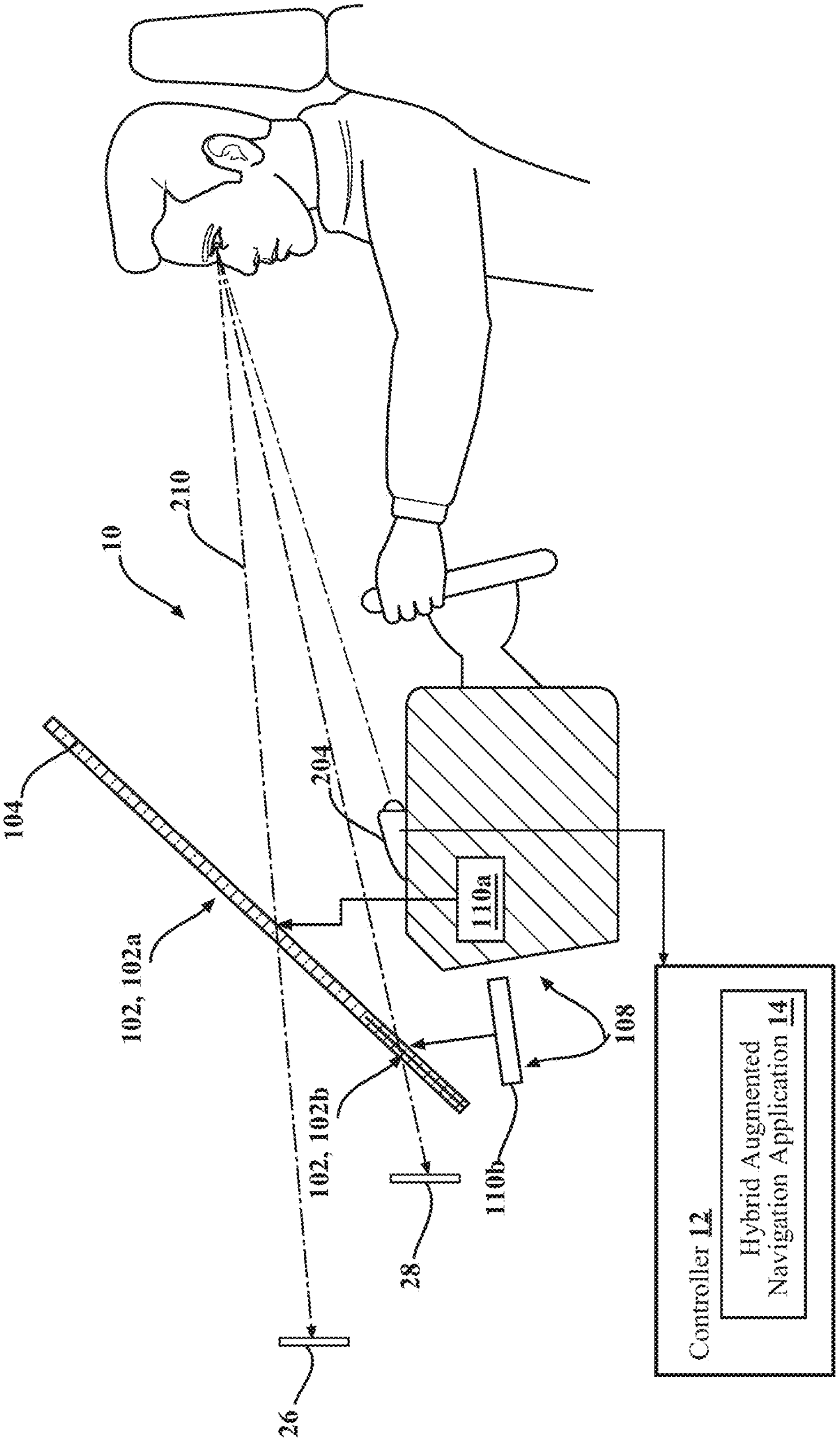
FIG. 5 is a schematic diagram of a hybrid augmented navigation system projecting tactical navigation graphics and strategic navigation graphics from a hybrid augmented navigation application according to the present disclosure.

For example, FIG. 5 illustrates an exemplary schematic of the imaging system 200 integrated with the vehicle 100. The tracking camera 204 of the imaging system 200 is configured to monitor a gaze 210 of the driver to assist in defining the primary viewing envelope 102. Further, the gaze 210 may be utilized by the hybrid augmented navigation application 14 to identify and determine the primary viewing envelope 102 by analyzing the gaze 210 relative to the windshield 104. The area at which the gaze 210 is primarily directed may be defined as the primary viewing envelope 102. For example, the tracking camera 204 captures the gaze 210 and communicates the gaze 210, via the image data 202, to the hybrid augmented navigation application 14. The gaze 210 indicates to the hybrid augmented navigation application 14 a direction that the driver is looking, which the hybrid augmented navigation application 14 may use to determine both the primary viewing envelope 102 and identify the trajectory 16.

Referring still to FIGS. 2-5, the vehicle 100 is also equipped with a navigation system 300 that is configured to communicate navigation data 302 with the controller 12. The navigation data 302 may be used by the hybrid augmented navigation application 14 to generate the hybrid augmented navigation 18. The navigation data 302 may be gathered by the navigation system 300 via a global positioning system (GPS), such that the navigation data 302 may generally correspond with GPS data. The navigation system 300 may also gather the navigation data 302 from a back-office server. The navigation data 302 from the back-office server may provide real-time data gathered from active vehicles in communication with the back-office server. The navigation data 302 may be utilized to supplement the image data 202 gathered by the imaging system 200 to facilitate the hybrid augmented navigation application 14 in generating the hybrid augmented navigation 18. For example, the navigation system 300 is configured to generate a route 304 based on inputs from a user, which may be used to further identify the trajectory 16 of the vehicle 100.

The controller 12 is communicatively coupled with the imaging system 200 and the navigation system 300 and is configured to generate the hybrid augmented navigation 18 at the windshield 104 via the hybrid augmented navigation application 14. The hybrid augmented navigation application 14 is executed by data processing hardware 22 of the controller 12. The controller 12 may also include memory hardware 24 in communication with the data processing hardware 22. The memory hardware 24 stores instructions that, when executed on the data processing hardware 22, cause the data processing hardware 22 to perform operations. The operations include the executions performed by the hybrid augmented navigation application 14 and are described herein.

The hybrid augmented navigation application 14 includes tactical navigation graphics 26 projected at the tactical region 102*a* of the primary viewing envelope 102 and strategic navigation graphics 28 projected at the strategic region 102*b* of the primary viewing envelope 102. The tactical navigation graphics 26 and the strategic navigation graphics 28 are configured as part of the hybrid augmented navigation 18 and are simultaneously provided to the driver at the primary viewing envelope 102 of the vehicle 100. The hybrid augmented navigation application 14 is configured to generate the tactical navigation graphics 26 and the strategic navigation graphics 28 based on the image data 202 from the imaging system 200. For example, the image data 202 may be used to identify the surrounding environment relative to the vehicle 100, which may assist in generating the tactical navigation graphics 26.

The vehicle 100 may also include a display 108 proximate to the windshield 104. The display 108 may include a first head-up display (HUD) 110*a* and a second HUD 110*b*, which are communicatively coupled with the controller 12. The first HUD 110*a* and the second HUD 110*b* receive the tactical and strategic navigational graphics 26, 28 from the hybrid augmented navigation application 14 and project the hybrid augmented directions 18 at the primary viewing envelope 102. For example, the first HUD 110*a* may be configured to project the tactical navigation graphics 26 at the tactical region 102*a* of the primary viewing envelope 102, and the second HUD 110*b* may be configured to project, via a second projection camera 206*b*, the strategic navigation graphics 28 at the strategic region 102*b* of the primary viewing envelope 102. The display 108 is utilized to generate a ghost display of the tactical navigation graphics 26 and the strategic navigation graphics 28, such that the tactical navigation graphics 26 and the strategic navigation graphics 28 appear to be floating in front of the vehicle 100 at the primary viewing envelope 102 of the windshield 104. For example, the driver may see a virtual image outside of the windshield 104.

Referring still to FIGS. 2-5, the tactical navigation graphics 26 may include a navigation path 30 based on the navigation data 302 and mirroring the trajectory 16 of the vehicle 100. The navigation path 30 is projected at the tactical region 102*a* of the windshield 104, such that the navigation path 30 is augmented on the road at the tactical region 102*a* to provide guidance to the driver. For example, the projector camera 206 is configured to project the tactical navigation graphics 26 at the tactical region 102*a* to create that navigation path 30. The navigation path 30 is a guide and may be configured as an arrow or other mapped trajectory 16 of the vehicle 100. In some examples, the navigation path 30 follows a curvature of a road and may indicate a direction of the vehicle 100. The tactical navigation graphics 26 may be free from detailed information and are configured to provide general, tactical guidance for the driver while operating the vehicle 100.

The strategic navigation graphics 28 are configured to present detailed, turn-by-turn directions for the driver. For example, the strategic navigation graphics 28 provide a parsed or modified navigation map to provide landmark information to the driver. The strategic navigation graphics 28 provide an abstraction of a map to provide a simplified graphic and visual fluency. The tactical navigation graphics 26 and the strategic navigation graphics 28 are collectively referred to herein as the hybrid augmented navigation 18, as the driver collectively utilizes the hybrid augmented navigation 18 to operate the vehicle along the route 304 generated by the navigation system 300. The strategic navigation graphics 28 are configured to advantageously assist the driver by being presented at the strategic region 102*b* of the primary viewing envelope 102. The strategic navigation graphics 28 may, thus, be in a line of sight of the driver. Thus, the driver may consistently have both the tactical navigation graphics 26 and the strategic navigation graphics 28 in view within the primary viewing envelope 102, such that the driver may maintain consistent view of the trajectory 16.

Referring still to FIGS. 2-5, the strategic navigation graphics 28 include landmark indicia 32 based on the image data 202 and the navigation data 302. For example, the landmark indicia 32 may include, but are not limited to, major turns in the road, rivers, streams, overpasses, signage, traffic lights, buildings, and other known or identifiable landmarks 34. In some instances, the landmarks 34 may be historical in that the landmark 34 is not active, but was previously well known. The strategic navigation graphics 28 may reflect the landmarks 34 with the landmark indicia 32 integrated as part of the strategic navigation graphics 28. The strategic navigation graphics 28 may also include distance instructions 36 relative to the landmarks 34.

Figure 4:
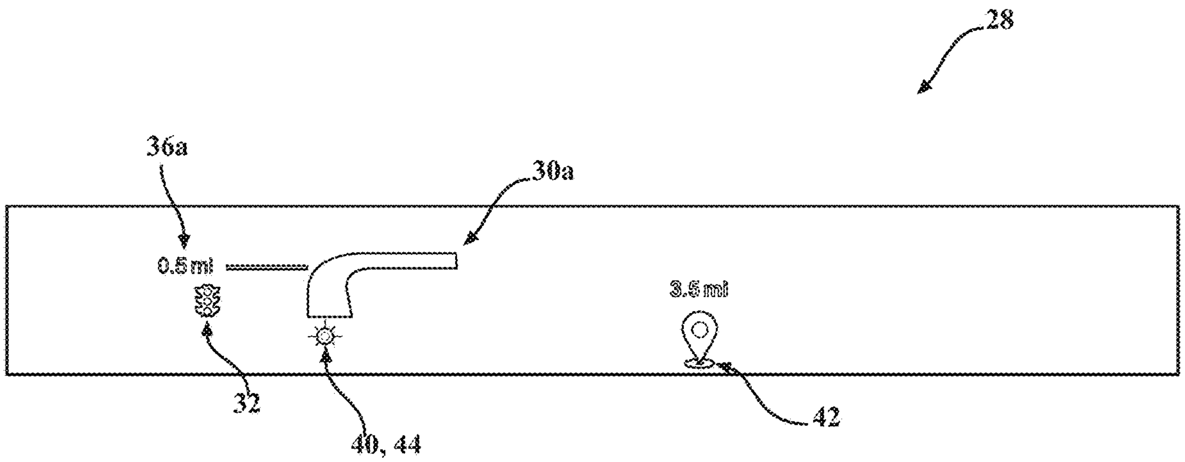
FIG. 4 is a schematic of strategic navigation graphics of a hybrid augmented navigation application according to the present disclosure.

For example, the distance instructions 36 may include a distance 36*a* between a first landmark 34*a* and a second landmark 34*b*. Thus, the driver may utilize the strategic navigation graphics 28 to identify what landmarks 34 are defined between a current position 44 of the vehicle 100 and the next maneuver. FIG. 4 illustrates an exemplary distance instruction 36 of the strategic navigation graphics 28, where the first landmark 34*a* is represented by a stoplight, landmark indicia 32 and the second landmark 34*b* is represented by an approaching turn (i.e., a next maneuver) in the route 304. The driver is notified of the distance from the nearest landmark 34 (i.e., the stoplight) to an upcoming maneuver (i.e., a turn in the route 304) via the strategic navigation graphics 28 (i.e., the landmark indicia 32).

As generally mentioned above, the strategic navigation graphic 28 is configured to provide strategic, navigation information to the driver, as compared to the tactical information provided by the tactical navigation graphics 26. The strategic navigation graphics 28 are designed for the driver to easily assess the landmark indicia 32 and identify upcoming maneuvers of the vehicle 100 relative to the navigation path 30 of the tactical navigation graphics 26. The hybrid augmented navigation application 14 also includes a compass function 40 that is executed as part of the strategic navigation graphics 28.

The compass function 40 is configured to project a destination marker 42 relative to a location 44 of the vehicle 100 as part of the strategic navigation graphics 28 in the strategic region 102*b* of the primary viewing envelope 102. The compass function 40 is configured to move the destination marker 42 about the landmark 34 based on a direction of the vehicle 100. For example, the destination marker 42 functions as a center-point of the compass function 40 about which the landmark indicia 32 are oriented. The compass function 40 may assist the driver should the driver deviate from the route 304 by maintaining the orientation of the vehicle 100 relative to the destination marker 42.

FIGS. 2 and 4 illustrate exemplary uses of the hybrid augmented navigation system 10. FIG. 2 illustrates the vehicle 100 with the operable hybrid augmented navigation 18 displayed with the tactical navigation graphics 26 in the tactical region 102*a* of the primary viewing envelope 102 and the strategic navigation graphics 28 in the strategic region 102*b* of the primary viewing envelope 102. The tactical navigation graphics 26 appear to be projected onto the road ahead of the vehicle 100 and follows the trajectory 16 of the vehicle 100. As mentioned above, the navigation path 30 of the tactical navigation graphics 26 is projected such that the navigation path 30 appears to be floating ahead of the vehicle 100 along the road. The strategic navigation graphics 28 may be positioned directly beneath the tactical navigation graphics 26 along the strategic region 102*b* of the primary viewing envelope 102.

FIG. 4 illustrates the strategic navigation graphics 28 in more detail. The landmark indicia 32 may be positioned relative to a replica navigation path 30*a* on the strategic navigation graphic 28. It is contemplated that the replica navigation path 30*a* is the same as the navigation path 30 (FIG. 2) generated as part of the tactical navigation graphics 26. The strategic navigation graphics 28 advantageously assist the driver in navigating the vehicle 100 by presenting the landmark indicia 32 along the replica navigation path 30*a*, so the driver can identify an associated location of the landmark 34 relative to the navigation path 30.

With further reference to FIGS. 2-5, the hybrid augmented navigation application 14 is configured to generate each of the tactical navigation graphics 26 and the strategic navigation graphics 28 in response to an input by the driver corresponding with a destination 306. The navigation system 300 generates the route 304 based on the destination 306 and a current location 44 of the vehicle 100. The navigation system 300 may also gather the navigation data 302 that includes potential landmarks 34 along the generated route 304. The landmarks 34 may be communicated with the controller 12 for use by the hybrid augmented navigation application 14 in generating the strategic navigation graphics 28.

The hybrid augmented navigation application 14 also receives the route 304 from the navigation system 300 and generates the tactical navigation graphics 26, including the navigation path 30, based on the route 304. The controller 12 also receives, at the hybrid augmented navigation application 14, the image data 202. The image data 202 may be primarily used in generating the strategic navigation graphics 28, but may also be used in generating the tactical navigation graphics 26, described below. The image data 202, as mentioned above, may advantageously provide the controller 12 with updated landmarks 34 that may otherwise be outdated in the navigation system 300. The external cameras 208 of the imaging system 200 gather image data 202 along the route 304 and may communicate the image data 202 with the controller 12.

The hybrid augmented navigation application 14 may update the landmark indicia 32 based on the image data 202 to provide up-to-date turn-by-turn directions. The image data 202 may also be used by the hybrid augmented navigation application 14 to generate the ghost display of the tactical navigation graphics 26. For example, the hybrid augmented navigation application 14 may analyze the image data 202 to generate the navigation path 30 within the environmental space surrounding and in front of the vehicle 100. While the hybrid augmented navigation application 14 may be able to generate the tactical navigation graphics 26 independent of the image data 202, the image data 202 assists to advantageously incorporate the navigation path 30 with the trajectory 16 of the vehicle 100 to maximize an augmented reality effect of the tactical navigation graphics 26.

Figure 6:
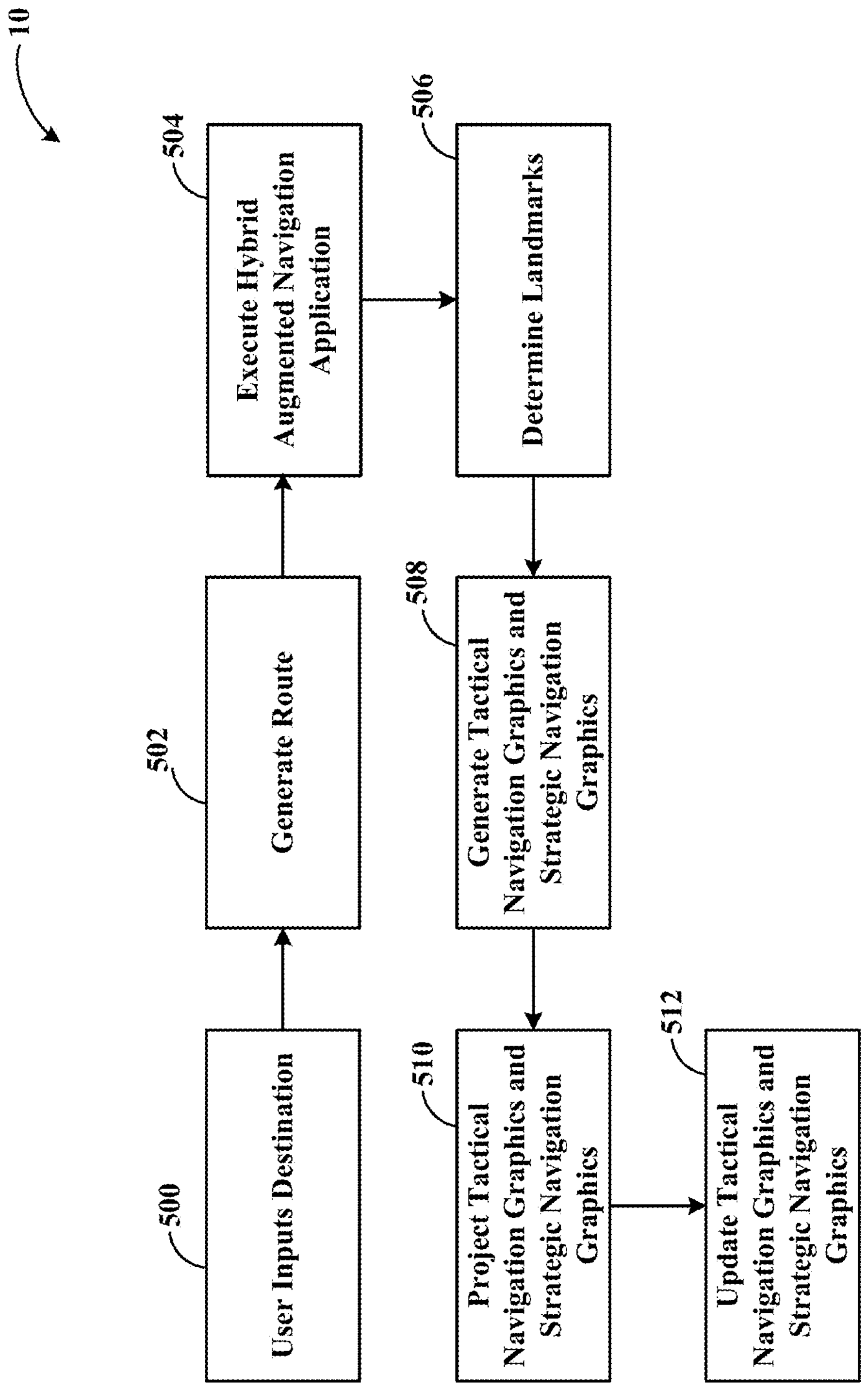
FIG. 6 is an exemplary flow diagram of a hybrid augmented navigation system according to the present disclosure.

Referring to FIG. 6, an exemplary flow diagram of the hybrid augmented navigation system 10 is depicted. At 500, a user inputs a destination into the navigation system 300 and the hybrid augmented navigation system 10 generates, at 502, a route 304 of the vehicle 100 to a destination 306. The hybrid augmented navigation system 10 executes, at 504, based on the generated route 304, the hybrid augmented navigation application 14 and determines, at 506, based on the navigation data 302 from the navigation system 300 and the image data 202 from the imaging system 200, landmarks 34 along the route 304. The hybrid augmented navigation system 10 may then generate, at 508, via the hybrid augmented navigation application 14, the tactical navigation graphics 26 and the strategic navigation graphics 28 based on the generated route 304 and determined landmarks 34 along the route 304.

At 510, the hybrid augmented navigation system 10 projects, at the primary viewing envelope 102 of the windshield 104, the tactical navigation graphics 26 and the strategic navigation graphics 28 and updates, at 512, via the hybrid augmented navigation application 14, the tactical navigation graphics 26 and the strategic navigation graphics 28 based on updated image data 202.

Referring again to FIGS. 1-6, the hybrid augmented navigation system 10 advantageously provides a driver with the hybrid augmented navigation 18 at the primary viewing envelope 102 of the vehicle 100. The projection of the hybrid augmented navigation 18 at the primary viewing envelope 102 assists in maintaining a head-up operation of the vehicle 100, as the driver is able to monitor the generated route 304 via both the tactical navigation graphics 26 and the strategic navigation graphics 28. The placement of the tactical and strategic navigation graphics 26, 28 provides ease of use, such that the driver can easily view both the tactical navigation graphics 26 and the strategic navigation graphics 28. The driver may primarily reference the navigation path 30 of the tactical navigation graphics 26 during operation, but may frequently reference the strategic navigation graphics 28 when anticipating a maneuver of the vehicle 100. Thus, the ability of the driver to view both turn-by-turn directions (i.e., the strategic navigation graphics 28) and a generalized route navigation (i.e., the tactical navigation graphics 26) advantageously assists the driver in maintaining forward-focus during operation of the vehicle 100.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A hybrid augmented navigation system for a vehicle, the hybrid augmented navigation system including:

a windshield including a primary viewing envelope, the primary viewing envelope including a tactical region extending along a majority of a height of the windshield and a strategic region extending along a majority of a width of the windshield, the strategic region defined by a blacked out area of the windshield;

an imaging system including a tracking camera;

a navigation system including navigation data; and a controller communicatively coupled with the imaging system and the navigation system and configured to generate a hybrid augmented navigation at the windshield via a hybrid augmented navigation application, the hybrid augmented navigation application including tactical navigation graphics projected at the tactical region of the primary viewing envelope and strategic navigation graphics projected at the strategic region of the primary viewing envelope, the tactical navigation graphics including a navigation path and the strategic navigation graphics including landmark indicia based on the navigation data.

2. The hybrid augmented navigation system of claim 1, wherein the hybrid augmented navigation application is configured to generate the tactical navigation graphics and the strategic navigation graphics based on image data from the imaging system.

3. The hybrid augmented navigation system of claim 1, wherein the navigation path is projected at the tactical region of the windshield.

4. The hybrid augmented navigation system of claim 1, wherein the strategic navigation graphics include distance instructions, the distance instructions being a distance between a first landmark and a second landmark.

5. The hybrid augmented navigation system of claim 1, wherein the hybrid augmented navigation application includes a compass function configured to project a destination marker relative to a location of the vehicle via the strategic navigation graphics.

6. The hybrid augmented navigation system of claim 5, wherein the compass function is configured to move the destination marker about a landmark based on a direction of the vehicle.

7. The hybrid augmented navigation system of claim 1, further including a display proximate to the windshield and including a first head-up display (HUD) and a second HUD.

8. The hybrid augmented navigation system of claim 7, wherein the first HUD is configured to project the tactical navigation graphics at the tactical region of the primary viewing envelope and the second HUD is configured to project the strategic navigation graphics at the strategic region of the primary viewing envelope.

9. The hybrid augmented navigation system of claim 1, wherein the tracking camera is configured to monitor a gaze of a user, the hybrid augmented navigation application being configured to identify the primary viewing envelope based on the monitored gaze received from the tracking camera.

10. A computer-implemented method when executed by data processing hardware causes the data processing hardware to perform operations comprising:

generating, via a navigation system, a route of a vehicle to a destination;

executing, based on the generated route, a hybrid augmented navigation application;

determining, based on navigation data from the navigation system and image data from an imaging system, landmarks along the route;

generating, via the hybrid augmented navigation application, tactical navigation graphics and strategic navigation graphics based on the generated route and determined landmarks along the route;

projecting, at a primary viewing envelope of a windshield, the tactical navigation graphics and the strategic navigation graphics, the primary viewing envelope including a tactical region extending along a majority of a height of the windshield and a strategic region extending along a majority of a width of the windshield, the strategic region defined by a blacked out area of the windshield; and updating, via the hybrid augmented navigation application, the tactical navigation graphics and the strategic navigation graphics based on updated image data.

11. The method of claim 10, further including executing, via the hybrid augmented navigation application, a compass function based on the strategic navigation graphics and the destination.

12. The method of claim 11, wherein executing the compass function includes orienting, based on the destination, the strategic navigation graphics.

13. The method of claim 10, wherein projecting the tactical navigation graphics and the strategic navigation graphics includes projecting the tactical navigation graphics at the tactical region of the primary viewing envelope and projecting the strategic navigation graphics at the strategic region of the primary viewing envelope.

14. The method of claim 10, wherein generating the strategic navigation graphics includes generating landmark indicia.

15. A hybrid augmented navigation system comprising:

data processing hardware; and memory hardware in communication with the data processing hardware, the memory hardware storing instructions that when executed on the data processing hardware cause the data processing hardware to perform operations comprising:

generating, via a navigation system, a route of a vehicle to a destination;

executing, based on the generated route, a hybrid augmented navigation application;

determining, based on navigation data from the navigation system and image data from an imaging system, landmarks along the route;

generating, via the hybrid augmented navigation application, tactical navigation graphics and strategic navigation graphics based on the generated route and determined landmarks along the route;

projecting, at a primary viewing envelope of a windshield, the tactical navigation graphics and the strategic navigation graphics, the primary viewing envelope including a tactical region extending along a majority of a height of the windshield and a strategic region extending along a majority of a width of the windshield, the strategic region defined by a blacked out area of the windshield; and updating, via the hybrid augmented navigation application, the tactical navigation graphics and the strategic navigation graphics based on updated image data.

16. The hybrid augmented navigation system of claim 15, further including executing, via the hybrid augmented navigation application, a compass function based on the strategic navigation graphics and the destination.

17. The hybrid augmented navigation system of claim 16, wherein executing the compass function includes orienting, based on the destination, the strategic navigation graphics.

18. The hybrid augmented navigation system of claim 15, wherein projecting the tactical navigation graphics and the strategic navigation graphics includes projecting the tactical navigation graphics at the tactical region of the primary viewing envelope and projecting the strategic navigation graphics at the strategic region of the primary viewing envelope.

19. The hybrid augmented navigation system of claim 15, wherein generating the strategic navigation graphics includes generating landmark indicia.

20. A vehicle equipped with the hybrid augmented navigation system of claim 15.

* * * * *